J. PRASCH, Sr. & S. TRIPP.
JOINT STRUCTURE.
APPLICATION FILED FEB. 15, 1913.
1,085,481.  Patented Jan. 27, 1914.
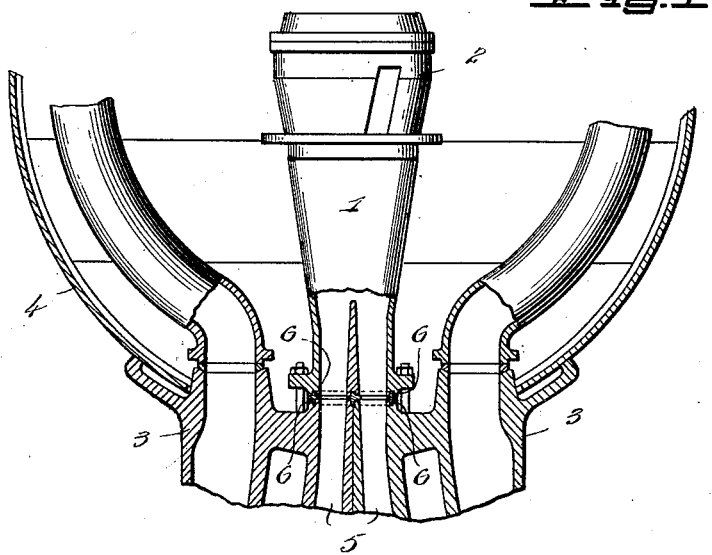
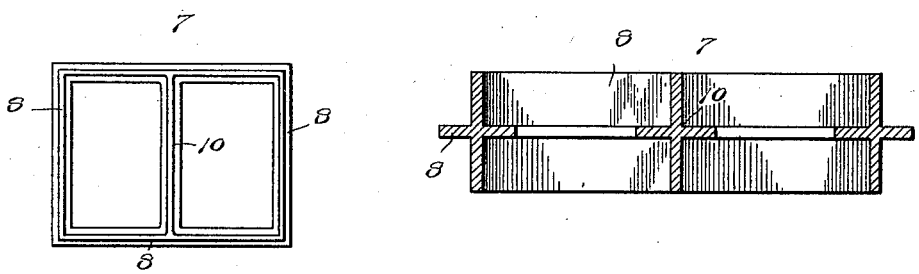
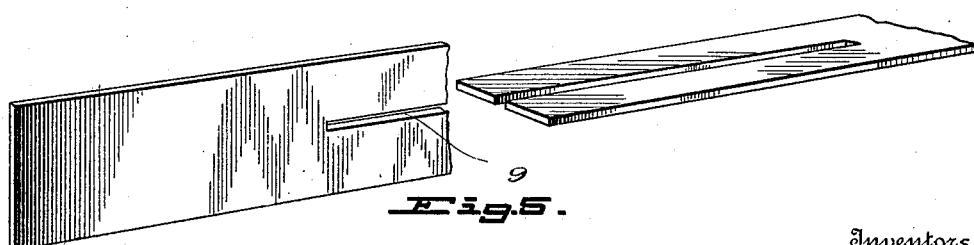
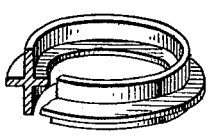
Witnesses
Chas. E. Kimper,
John J. McCarthy
Inventors
Joseph Prasch, Sr.,
Solomon Tripp.
By Victor J. Evans
Attorney

UNITED STATES PATENT OFFICE.

JOSEPH PRASCH, SR., AND SOLOMON TRIPP, OF FORT MADISON, IOWA.

JOINT STRUCTURE.

1,085,481. Specification of Letters Patent. Patented Jan. 27, 1914.

Application filed February 15, 1913. Serial No. 748,618.

*To all whom it may concern:*

Be it known that we, JOSEPH PRASCH, Sr., and SOLOMON TRIPP, citizens of the United States, residing at Fort Madison, in the county of Lee and State of Iowa, have invented new and useful Improvements in Joint Structures, of which the following is a specification.

This invention relates to certain novel and useful improvements in joints and has particular application to gaskets for effecting fluid tight joints between two connected elements.

In carrying out the present invention, it is our purpose to provide a gasket whereby a fluid tight joint between two connected parts such, for instance, as pipe sections or the like will be produced and by means of which the joint will be reinforced or strengthened.

It is also our purpose to provide a gasket for effecting fluid tight joints which will embrace the desired features of simplicity, efficiency and durability coupled with cheapness of cost in manufacture and marketing and which may be readily applied to the parts to be joined or connected.

With the above and other objects in view, the invention consists in the construction, combination and arrangement of parts hereinafter set forth in and falling within the scope of the claim.

In the accompanying drawings; Figure 1 is a vertical transverse central sectional view through the upper portion of a pair of locomotive cylinder saddles and a connected exhaust pipe illustrating the application of our invention. Fig. 2 is a top plan view of the gasket or joint ring detached. Fig. 3 is an enlarged transverse sectional view therethrough. Fig. 4 is a detail perspective view of a modified form of gasket or joint ring. Fig. 5 is a detail perspective view of a further modified form of gasket, parts being broken away.

In the present instance, our invention is illustrated as applied in connection with a locomotive exhaust pipe 1 having a detachable tip or nozzle 2 appropriately connected to the upper end thereof. This exhaust pipe may be of any approved or well known type and is herein shown conventionally.

The numeral 3 indicates cylinder saddles or an equivalent bed plate, on which the smoke box 4 of the locomotive is supported and with which communicates the exhaust pipe 1 by way of exhaust steam passages 5 bored in the saddles or bed plate, the exhaust steam from the locomotive engine cylinders passing through the exhaust steam passages and exhaust pipe to the atmosphere. In practice, as a rule, the joint between the exhaust pipe 1 and the saddles or bed plate is effected either by directly seating the respective end of the exhaust pipe upon the saddles at the exhaust openings therein, or by interposing between the confronting portions of the saddles and exhaust pipe a packing ring of squared cross sectional configuration. In either event, the joint is inefficient, unreliable and open to many other objections. For instance, when a packing ring or gasket, square in cross section, is interposed between the exhaust pipe and the bed plate, the joint is comparatively weak and the ring, under the action of the intense heat, owing to the steam passing through the communicating passages to the atmosphere, caused to expand and, when the engine is shut down, to contract incident to cooling, thereby rendering the ring or gasket useless after a relatively short period of time. In order to remedy these and many other difficulties inherent in joints subjected to heat, and at the same time form a fluid tight joint between the connected parts, we form in the confronting edges, faces or parts of the elements to be joined grooves 6, 6 alining with each other and interposed between such grooved portions is a gasket or packing ring 7 which may be constructed of metal or some other suitable substance or material and is formed of two strips of material 8, 8 intersecting one another at right angles and forming, in the accompanying illustration, a horizontal web and a vertical web integrally connected. The portions of the vertical web at the opposite sides of the horizontal web are disposed within the alining groove 6, 6 formed in the confronting portions of the connected elements, while the horizontal web is interposed between the adjacent portions of the elements. It will be seen that the vertical web is relatively wide as compared with the width of the horizontal web and seats within the grooves in such manner as to reinforce the parts at the joint and at the same time coöperates with the horizontal web to form a fluid tight joint which remains practically unaffected by the action of heat and consequently is non-expansible.

A modified form of gasket or packing ring is shown in Fig. 4 and in this case the packing ring or gasket is composed of two separable sections or webs originally in the form of strips, one end of the relatively wide web having a slot 9 formed therein, while the narrow web is slotted from one end to a point immediately adjacent to the other end, the material at the closed end lying within the slot 9 formed in the relatively wide web. Subsequent to assembling the webs in gasket formation, in the manner which is obvious, the metal or other substance forming the sections or webs is bent in some suitable manner into ring or other form and the ends welded or otherwise appropriately secured together. In this instance, the gaskets or rings constructed in accordance with our invention are provided with central bridges 10 so as to accommodate the partition dividing the passages in the saddles.

In Fig. 5 of the drawing, we have shown a further modified form of gasket or packing ring and in this instance, the gasket is cast in circular form so as to accommodate the meeting ends of pipes or conduits of similar contour.

While we have herein shown and described certain preferred forms of our invention by way of illustration, and set out one particular manner of employing the same, we wish it to be understood that we do not limit or confine ourselves to the exact details of construction herein described and delineated, or to the particular application of the invention herein shown, as modification and variation may be made within the scope of the claim and without departing from the spirit of the invention, and the invention employed wherever it is desired to join or connect two elements or parts.

We claim:

In combination, two elements to be joined, having grooves formed in the confronting faces thereof, a gasket or packing ring interposed between the confronting portions of such elements and composed of intersecting web members, one of said web members being relatively wide as compared with the width of the other and disposed within the grooves of said elements, and coöperating with the other web member to form a fluid tight joint and whereby the parts to be joined are reinforced at the point of connection.

In testimony whereof we affix our signatures in presence of two witnesses.

JOSEPH PRASCH, Sr.
SOLOMON TRIPP.

Witnesses:
GUSS GRAHAM,
W. H. GUNN.

---

Copies of this patent may be obtained for five cents each, by addressing the "Commissioner of Patents, Washington, D. C."